Jan. 17, 1961 G. H. CAINE ET AL 2,968,249
AXIAL FLOW APPARATUS
Filed Sept. 4, 1958
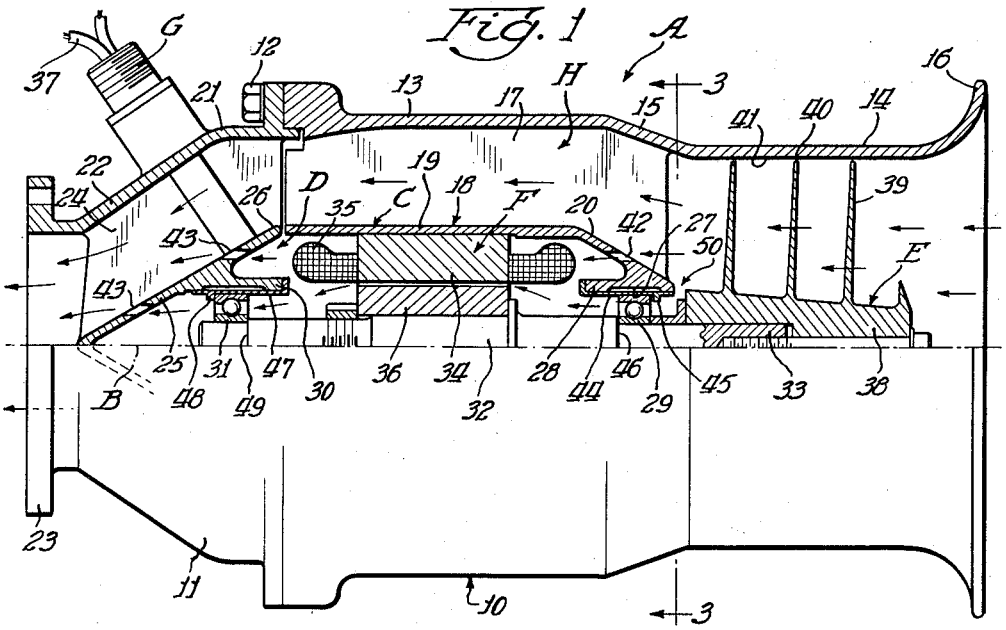
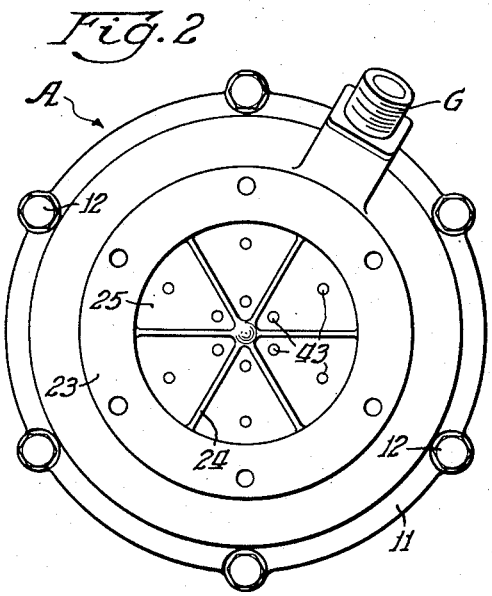
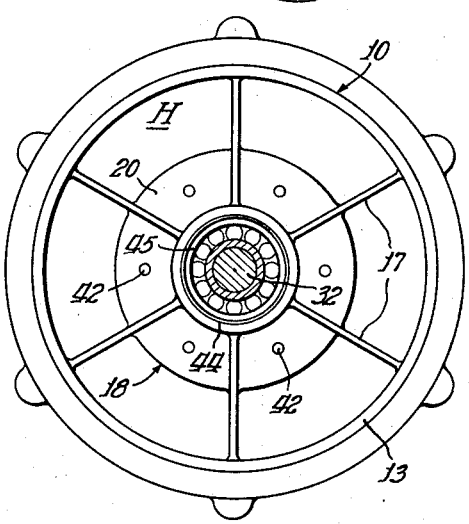
Inventors:
Gerard H. Caine and
John F. DiStefano
By: Frank C. Parker Atty.

United States Patent Office 2,968,249
Patented Jan. 17, 1961

2,968,249

AXIAL FLOW APPARATUS

Gerard H. Caine, Mayfield Village, and John F. Di Stefano, Lyndhurst, Ohio, assignors to Borg-Warner Corporation, Chicago, Ill., a corporation of Illinois Filed Sept. 4, 1958, Ser. No. 759,097

1 Claim. (Cl. 103—87)

This invention relates to an axial fluid flow apparatus, and in particular, to an axial fluid flow unit comprising a plurality of outer hollow housing members each having a set of spaced vanes formed integrally therewith and projecting inwardly therefrom, each set of vanes being formed integrally with a section of a motor main frame whereby the sections form a motor main frame when the outer housing members are aligned together permitting the motor main frame to receive and support motor means therein for driving a rotor which causes fluid to flow axially between the outer housing members and the motor main frame.

It is well known in the art to manufacture a unit adapted to cause an axial flow of fluid therethrough by a fan or other impeller device carried by the unit. Such units are relatively compact and may be disposed in or form part of a fluid line and thus cause fluid flow therethrough. Of course, there are many other well known applications for axial fluid flow units.

The conventional type of axial fluid flow unit normally comprises an outer hollow housing member and an inner hollow housing member spaced therefrom by a plurality of spaced stator vanes, the stator vanes either being formed integrally with the outer and inner housing members or being formed separately and suitably attached thereto. The inner housing member is adapted to receive an electrical motor or other drive means for rotating a shaft carrying a rotor at one end thereof. The inner housing member may either receive and support an entire electrical motor unit or form a part of the electrical motor unit itself. The rotor is provided with a plurality of blades or vanes which cooperate with the outer housing member to cause an axial flow of fluid between the outer housing member and the inner housing member when the rotor is rotated by the drive means. The stator vanes are utilized to create an axial flow of the fluid through the unit and eliminate turbulence or other disturbances of the fluid passing therethrough.

Much difficulty has been encountered in properly aligning bearing means for rotatably supporting the rotor carrying shaft within the outer housing member as a relatively close tip clearance between the rotor blades and the outer housing member must be maintained to provide for maximum efficiency of the unit. When the inner housing member is utilized as part of the motor main frame, one of the bearing means is carried thereby and the other is carried by a support subsequently fastened thereto after the motor means have been disposed within the inner housing member. When the inner housing member is utilized to receive and support a complete motor unit, the motor unit has the bearing means built therein and must be properly aligned and fastened to the inner housing member. Therefore, it can be seen that in these designs there is no positive alignment between all of the bearing means and the outer housing member. Further, these prior art designs require that manual assembly or fastening of the bearing means must take place within the outer housing member thereby enhancing the tendency for providing initial misalignment of the shaft relative to the outer housing member because of the confining working area provided therein.

Some means must also be provided in the axial fluid flow apparatus to permit cooling of the bearing means as well as cooling of the driving means.

It is therefore an object of this invention to provide an improved axial flow apparatus comprising an outer housing and an inner housing spaced therefrom by a plurality of spaced stator vanes.

It is another object of this invention to provide an improved axial flow apparatus comprising an outer housing and an inner housing spaced therefrom by a plurality of spaced stator vanes, the inner housing carrying bearing means to rotatably support a shaft carrying a rotor for inducing an axial flow of fluid between the outer housing and the inner housing, and means for utilizing a portion of the axial flow of fluid for cooling the bearing means.

A further object of this invention is to provide an axial flow apparatus comprising a plurality of outer hollow housing members each having a set of vanes formed integral therewith and projecting inwardly therefrom, each set of vanes being formed integrally with a section of a motor main frame whereby the sections form a motor main frame when the outer housing members are disposed in aligned relation and whereby the motor main frame is adapted to receive motor means including a shaft rotatably supported by bearing means carried by at least some of the sections, the shaft extending beyond the motor main frame and carrying a rotor for causing an axial flow of fluid between the outer housing members and the motor main frame.

Another object of this invention is to provide an axial flow apparatus formed in accordance with the preceding object and having passage means formed in at least some of the sections of the motor main frame for permitting a portion of the axial flow of fluid between the outer housing members and the motor main frame to flow through the motor main frame and cool the bearing means and motor means carried therein.

Other and more particular objects, advantages, and uses of this invention become apparent from a reading of the following specification taken in connection with the accompanying drawings forming a part thereof and wherein:

Figure 1 illustrates, in a partial cross-sectional view, an axial flow apparatus formed in accordance with the teachings of this invention.

Figure 2 illustrates an end view of the axial flow apparatus illustrated in Figure 1.

Figure 3 is an end view, partially in section, taken on the line 3—3 of Figure 1.

Reference is now made to the accompanying drawings wherein like reference numerals and letters are used throughout the various figures thereof to indicate like parts, and particular reference is made to Figure 1 where the reference letter A indicates generally an axial fluid flow apparatus formed in accordance with the teachings of this invention and comprises a plurality of hollow outer housing members 10 and 11 suitably secured together by a plurality of bolts 12. The outer housing members 10 and 11 each have an inner, substantially centrally disposed axis which is disposed coaxially with respect to the axis of the other member when the outer housing members 10 and 11 are secured together in an aligned relation by the bolts 12, the axes defining a substantially, centrally disposed axis, designated by the reference letter B, for the apparatus A.

The outer housing member 10 is formed with a first cylindrical portion 13 integrally connected to a second cylindrical portion 14 by an angularly disposed portion 15. The outer end 16 of the second cylindrical portion 14 is flared substantially, radially outwardly to provide a fluid intake means for the apparatus A. A set of spaced stator vanes 17 are formed integrally with the outer housing member 10 and extend substantially radially inwardly therefrom. The inner ends of the vanes 17 are formed integrally with an inner hollow housing member or a section 18 of a motor main frame. The inner housing member 18 has a substantially cylindrical portion 19 formed integrally with an angularly disposed portion 20 thereof. The inner housing member 18 has a centrally disposed axis which is coincident with the centrally disposed axis of the outer housing member 10 whereby the inner housing member 18 is equally spaced from the outer housing member 10 throughout the entire outer periphery thereof by the set of vanes 17. The outer housing member 10, stator vanes 17, and inner housing member 18 may be integrally cast together to form a unitary structure.

The outer housing member 11 is formed with a cylindrical portion 21 formed integrally with an angularly disposed portion 22 having an outwardly flared end portion 23 forming an outlet means for the axial fluid flow apparatus A. The outer housing member 11 has a set of spaced vanes 24 formed integrally therewith and projecting radially inwardly therefrom. The vanes 24 are formed integrally at their inner ends with another inner hollow housing member or a section 25 of a motor main frame. The inner housing member 25 converges from an open end 26 thereof toward its centrally disposed axis which is coincident with the centrally disposed axis of the outer housing member 11. The outer housing member 11, stator vanes 24, and inner housing member 25 may also be integrally cast together to form a unitary structure.

When the outer housing members 10 and 11 are secured together by the bolts 12, the inner housing members or sections 18 and 25 of the motor main frame are disposed in an aligned relation and form a motor main frame, indicated generally by the reference letter C. The motor main frame C has a cavity D formed therein by the angularly disposed portions of the respective housing members 18 and 25, together with the cylindrical portion 19 of the inner housing member 18. It is to be understood that the inner housing members 18 and 25 may be utilized for purposes other than a motor main frame if desired.

The inner housing member 18 is formed with a bore 27 interrupting the angularly disposed portion 20 thereof and passing through an enlarged centrally disposed part thereof to define a tubular cylindrical portion 28. A suitable bearing means 29 is disposed within the bore 27 of the tubular portion 28 of the housing member 18. Similarly, the other inner housing member 25 is formed with a centrally disposed tubular portion 30 which is spaced from and coaxial with respect to the tubular portion 28 when the housing members 10 and 11 are placed in aligned relation. The tubular portion 30 also receives a suitable bearing means 31 therein.

An elongated shaft 32 is rotatably received in and supported by the bearing means 29 and 31 whereby the axis of rotation of the shaft 32 is coincident with the centrally disposed axis B. One end 33 of the shaft 32 extends through the bore 27 formed in the inner housing member 18 and is suitably connected to a rotor or inducer, indicated generally by the reference letter E. The shaft 32 is rotated by a suitable electrical motor means, indicated generally by the reference letter F, disposed within the inner housing section 18 and comprising a stator 34 carried by the inner housing member 18, suitable coil windings 35 carried by the stator 34, and a rotor 36 carried by the shaft 32. Such motor means F are well known in the art and other well known electrical driving means may be utilized if desired. A suitable electrical conduit, indicated generally by the reference letter G, is carried by the outer housing member 11 and projects inwardly therefrom through the inner housing member 25 to permit wire leads 37 to pass through the apparatus A into the cavity D. The wire leads are connected to the stator windings 35 in order to supply electrical current thereto from a source (not shown) located remote from the apparatus A.

The rotor E comprises a conical hub 38 having a plurality of vanes 39 wound spirally there around. The vanes 39 of the rotor E have tips 40 thereof adapted to be suitably spaced from the inner peripheral surface 41 of the second cylindrical portion 14 of the outer housing member 10 and adapted to cooperate therewith in a manner later to be described.

A plurality of passage means 42 are formed in the angular disposed portion 20 of the inner housing member 18 and, similarly, a plurality of passage means 43 are formed in the angularly disposed portion of the other inner housing member 25. The purpose of the passage means 42 and 43 will later be described.

As previously stated, it is desirable that the tips 40 of the rotor vanes 39 be maintained closely adjacent the interior surface 41 of the outer housing member 10 in order to provide maximum efficiency of the apparatus A. This is accomplished by maintaining a proper alignment of the bearing means 29 and 31 during the assembly of the apparatus A. The apparatus A may be assembled in substantially the following manner.

First the stator 34 and windings 35 are secured to the inner housing member 18 and the rotor 35 is secured to the shaft 32. The bearing means 29 is then placed in the tubular portion 28 of the inner housing member 18 and is prevented from moving to the right, as viewed in the drawing, by an interposed sleeve 44 having an inwardly projecting stop means 45 formed thereon and against which the bearing means 29 abuts. The end 33 of the shaft 32 is then projected through the bearing means 29 until further movement thereof to the right is prevented by abutment means 46 formed on the shaft 32. The bearing means 31 is disposed within the tubular portion 30 of the inner housing member 11 and is prevented from further movement to the left, as viewed in the drawings, by an interposed sleeve 47 having an inwardly projecting stop means 48 formed thereon and against which the bearing means 31 abuts. The outer housing member 11 is then properly aligned with respect to the outer housing member 10 by the fastening means or bolts 12, the bearing means 31 being telescopically received on the shaft 32 and being prevented from further movement to the right on the shaft 32 by abutment means 49 formed thereon. It can be seen that the fastening means 12, by being located exteriorly of the apparatus A, provides a readily accessible means for assembling and aligning of the outer housing members 10 and 11 whereby the bearing means 29 and 31, respectively and rigidly carried thereby, properly align the axis of the shaft 32 relative to the housing members 10 and 11. The shaft 32, being properly aligned within the housing members 10 and 11, permits the tips 40 of the stator vanes 39 to be accurately and closely spaced from the interior surface 41 of the outer housing member 10 when the rotor E is subsequently fastened to the end 33 of the shaft 32. It should be noted that the hub 38 of the rotor E is slightly spaced from the end of the inner housing member 18 to provide an annular passage 50 for a purpose later to be described.

The ends 16 and 23 of the respective outer housing members 10 and 11 may be suitably fastened by coupling means to adjacent ends of a fluid line (not shown) or be placed therein in a manner well known in the art.

The operation of the axial flow apparatus A will now be described. When the motor means F causes rotation of the shaft 32 and thus rotation of the rotor means E, the blades 39 thereof will cause the fluid in the fluid line to enter the inlet means 16 of the outer housing member 10 and will force the same rearwardly to flow axially through the axial flow spaces H formed between the stator vanes 17 and between the outer housing member 10 and the inner housing member 18. The fluid will be guided by the vanes 17 and 24 to the outlet means 23 thereof. A portion of the flow of fluid through the axial flow space H will enter the inlet means 42 as well as the annular opening 50 and flow through the bearing means 29, motor means M, and the bearing means 31, cooling the same. The fluid within the cavity D will then rejoin the remainder of the fluid flowing through the apparatus A by passing out of the motor main frame C through the passage means 43. The fluid flow through the apparatus A is designated by arrows in Figure 1, however, it is to be understood that a reverse flow through the apparatus A could be provided by changing the direction of rotation of the rotor E or the type thereof. It is also to be understood that the apparatus A will operate in a like manner when utilized in other applications thereof, and it is not intended that the apparatus A is limited to fluid line application.

It can be seen that there has been described an improved axial fluid flow unit wherein the shaft carrying the rotor for inducing axial flow through the unit is rotatably supported by bearing means positively aligned within the unit and thus assuring accurate alignment of the shaft, whereby a close tip clearance between the rotor blades and the outer housing is maintained. Further, any adjusting of the alignment of the bearing means to maintain the close tip clearance may be made at the exterior of the apparatus. Also, there has been disclosed means for cooling the bearing means supporting the shaft as well as means for cooling the driving means provided for rotating the shaft.

While this invention has been disclosed in connection with a certain specific embodiment thereof, it is to be understood this was by way of example rather than limitation, and it is intended that this invention be defined by the appended claim.

What is claimed is:

An axial flow fluid apparatus comprising a pair of outer hollow housing members each having an inner, substantially centrally disposed axis; a set of spaced vanes formed integrally with each housing member and projecting inwardly therefrom; one of said outer housing members having a first portion and a second portion, said first portion being formed integrally with the set of vanes thereof; a motor main frame having a section thereof formed integrally with each set of vanes and being spaced from the respective housing member; each main frame section having at least a portion thereof angularly disposed with respect to the axis of the respective outer housing member; means defining passage means in said angularly disposed portions of said sections; means to align said housing members together whereby said housing members are disposed co-axially with respect to each other and said sections are disposed in aligned relationship to form a motor main frame; electric motor means disposed in said motor main frame and including a shaft which projects beyond said motor main frame and into said second portion of said one of said outer housing members; each of said sections having bearing means to rotatably support said shaft whereby said shaft has an axis of rotation coincident with said axis of said outer housing members; and a rotor carried by said shaft and being disposed within said second portion of said one outer member, said rotor being spaced from the adjacent section of said motor main frame to define therewith an annular opening, said rotor when driven causing fluid flow between said motor frame and said outer housing members, and through said passage means and aid annular opening to cool said motor means and said bearings.

References Cited in the file of this patent

UNITED STATES PATENTS

| 2,039,698 | Beauchemin | May 5, 1936 |
| 2,506,827 | Goodner | May 9, 1950 |

FOREIGN PATENTS

| 69,101 | Netherlands | Dec. 15, 1951 |
| 693,258 | Great Britain | June 24, 1953 |
| 733,544 | Great Britain | July 13, 1955 |
| 1,137,606 | France | May 31, 1957 |